United States Patent
Bieltz

(10) Patent No.: US 10,604,131 B2
(45) Date of Patent: Mar. 31, 2020

(54) OPEN LOOP CONTROL FOR ELECTROMECHANICAL BRAKE

(71) Applicant: Robert Bosch GmbH, Stuttgart (DE)

(72) Inventor: Karsten Bieltz, Mundelsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/034,735

(22) Filed: Jul. 13, 2018

(65) Prior Publication Data
US 2020/0017093 A1    Jan. 16, 2020

(51) Int. Cl.
*H02P 6/12* (2006.01)
*B60T 13/66* (2006.01)
*B60T 13/14* (2006.01)
*H02P 6/24* (2006.01)

(52) U.S. Cl.
CPC .......... *B60T 13/662* (2013.01); *B60T 13/143* (2013.01); *H02P 6/12* (2013.01); *H02P 6/24* (2013.01); *B60T 2270/402* (2013.01); *B60T 2270/404* (2013.01)

(58) Field of Classification Search
CPC ........ B60T 8/171; B60T 8/885; B60T 8/1703; B60T 8/0185
See application file for complete search history.

(56) References Cited

U.S. PATENT DOCUMENTS

| | | | |
|---|---|---|---|
| 5,050,940 A * | 9/1991 | Bedford | B60T 8/1703 188/181 C |
| 5,170,343 A * | 12/1992 | Matsuda | B60G 17/0185 700/79 |
| 5,835,875 A | 11/1998 | Kirchhoffer et al. | |
| 6,188,947 B1 | 2/2001 | Zhan | |
| 7,363,186 B1 | 4/2008 | Costello et al. | |
| 9,610,927 B2 * | 4/2017 | Ayichew | B60T 8/171 |
| 9,663,078 B1 * | 5/2017 | Rook | B60T 8/885 |
| 9,776,607 B2 | 10/2017 | Breen et al. | |
| 2006/0175895 A1 | 8/2006 | Mahlo et al. | |
| 2017/0126154 A1 | 5/2017 | Shim et al. | |
| 2017/0282877 A1 | 10/2017 | Besier et al. | |
| 2017/0310265 A1 | 10/2017 | Matsuura et al. | |

FOREIGN PATENT DOCUMENTS

| | | |
|---|---|---|
| CN | 105197002 A | 12/2015 |
| DE | 102016210369 A1 | 1/2017 |
| JP | 2009124870 A | 6/2009 |

* cited by examiner

*Primary Examiner* — Rina I Duda
(74) *Attorney, Agent, or Firm* — Michael Best & Friedrich LLP

(57) ABSTRACT

Systems and methods for providing open loop motor control for an electromechanical brake when closed loop motor control fails. The method includes determining, with an electronic controller, whether a rotor position sensor or a current sensor is not operating correctly, generating, with the electronic controller, a generated control signal for controlling a permanent magnet synchronous machine, and activating, with the electronic controller, the permanent magnet synchronous machine using the generated control signal to generate a stator magnetic field to operate the rotor of the permanent magnet synchronous machine of the electromechanical brake.

18 Claims, 5 Drawing Sheets

OPEN LOOP CONTROL FOR ELECTROMECHANICAL BRAKE

Embodiments relate to systems and methods for providing limited open loop control to an electromechanical brake when a closed loop control system fails.

BACKGROUND

In modern braking systems, vacuum brakes are being replaced by electromechanical and vacuum-free brakes (for example, the iBooster brake created by Robert Bosch GmbH). Electromechanical and vacuum-free brakes only use electrical energy during application of the brakes, which saves fuel and reduces $CO_2$ emissions of the vehicle because energy from the combustion engine is not required to apply more pressure to the brakes.

Electromechanical brakes are controlled based upon sensor input (for example, a brake pedal travel sensor, a permanent magnet synchronous machine rotor position sensor, an permanent magnet synchronous machine current sensor, and the like). An electronic controller that controls the electromechanical brake receives feedback from the sensors in order to correctly operate the electromechanical brake. If the electronic controller does not receive feedback or receives faulty signals from the sensors, the electromechanical brake may be incorrectly controlled or not activated at all.

SUMMARY

Therefore, a system is needed to provide limited open loop control of the electromechanical brake in case a sensor in a closed loop control system fails.

One embodiment provides a system that implements open loop motor control for an electromechanical brake when closed loop motor control fails. The system includes an electromechanical brake mechanism including a permanent magnet synchronous machine, a rotor position sensor configured to detect a position of a rotor of the permanent magnet synchronous machine, a motor current sensor, and an electronic controller configured to determine whether at least one of the rotor position sensor and the motor current sensor is not operating correctly, generate a control signal for controlling the permanent magnet synchronous machine, and activate the permanent magnet synchronous machine using the generated control signal to generate a stator magnetic field to operate the rotor of the permanent magnet synchronous machine.

One embodiment provides a method for providing open loop motor control for an electromechanical brake when closed loop motor control fails. The method includes determining, with an electronic controller, whether a rotor position sensor or a current sensor is not operating correctly, generating, with the electronic controller, a generated control signal for controlling a permanent magnet synchronous machine, and activating, with the electronic controller, the permanent magnet synchronous machine using the generated control signal to generate a stator magnetic field to operate the rotor of the permanent magnet synchronous machine of the electromechanical brake.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
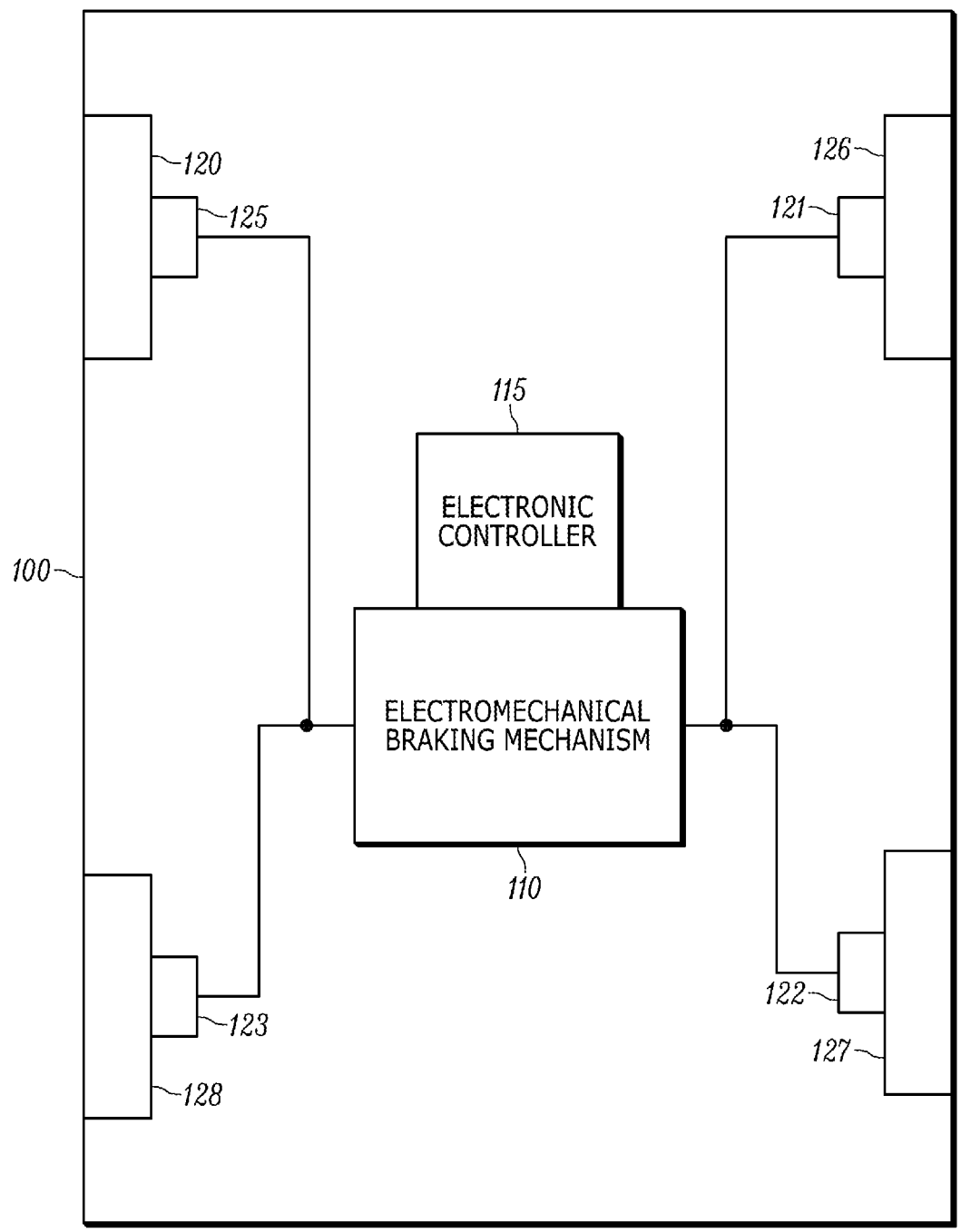
FIG. 1 illustrates a vehicle that includes a braking system according to one embodiment.

FIG. 1 illustrates a vehicle 100 including a braking system 105. The braking system 105 includes an electromechanical braking mechanism 110 and an electronic controller 115. The electromechanical braking mechanism 110 is communicatively coupled to the electronic controller 115 and hydraulically coupled to brakes 120-123, which are configured to be applied to wheels 125-128.

In the embodiment illustrated by FIG. 1, the vehicle 100 is a four-wheeled vehicle, such as an automobile, bus, and the like. However, it is to be understood that the braking system 105 may be implemented in other vehicles with more or less wheels (for example, in a motorcycle).

Figure 2:
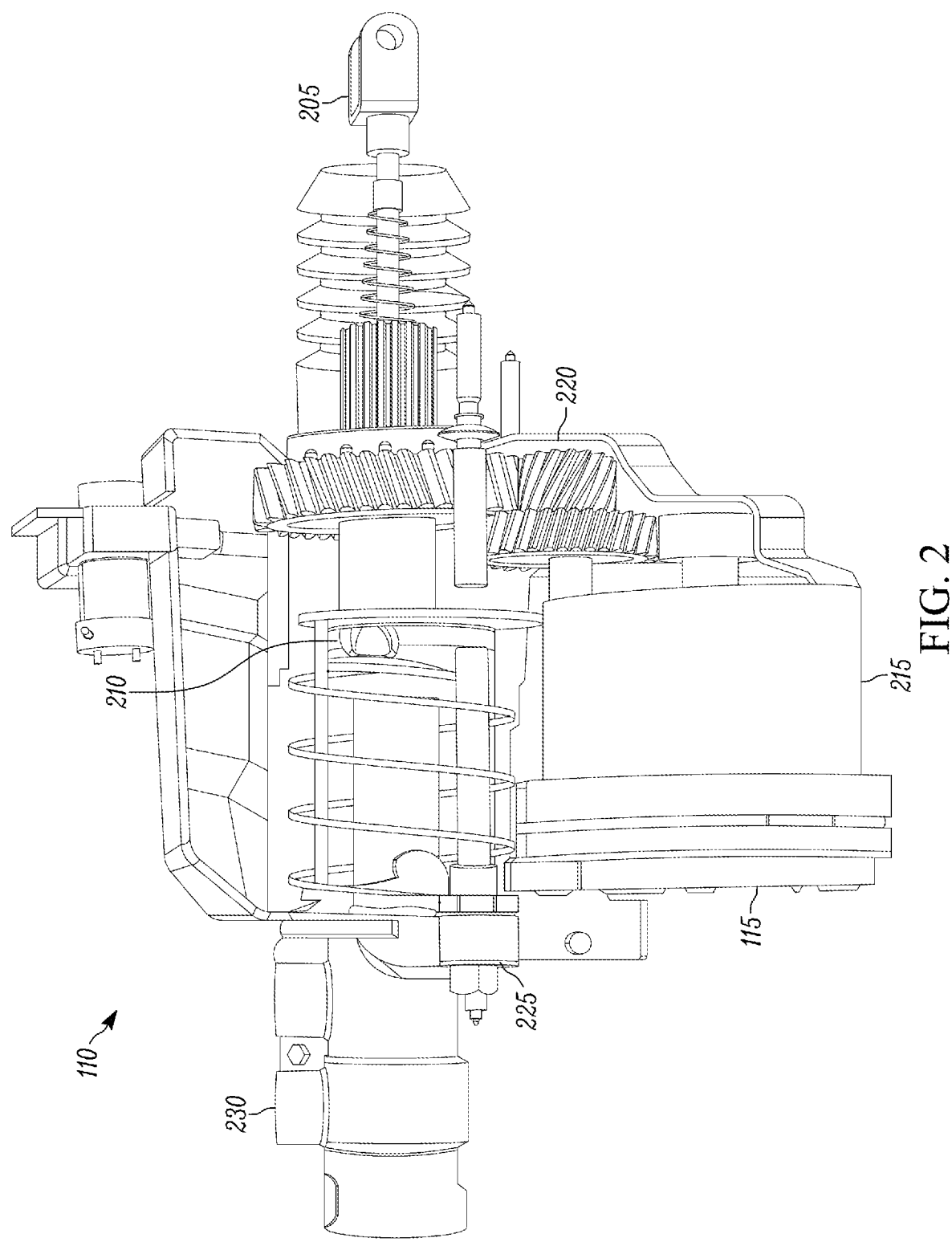
FIG. 2 illustrates an electromechanical braking mechanism according to one embodiment.

An example of the electromechanical braking mechanism 110 is illustrated in FIG. 2.

The electromechanical braking mechanism 110 includes an input rod 205, a travel sensor 210, a permanent magnet synchronous machine 215, a gear system 220, a boost element 225, and a master cylinder 230.

The input rod 205 receives input from an operator of the vehicle 100 to actuate the rest of the electromechanical braking mechanism 110. For example, the input rod 205 may be connected to a brake pedal, which is depressed by the operator of the vehicle 100 in order to brake the vehicle 100. The input rod 205 moves in response to user input. In self-driving vehicles, the input rod 205 may be moved with no input from a user (for example, receiving a brake request from a separate electronic controller). Instead, the input rod 205 may be moved by a motor, or may not be moved at all. If the input rod 205 is not moved at all, the electronic controller 115 may receive the brake request from the separate electronic controller in order to actuate the electromechanical braking mechanism 110.

The travel sensor 210 detects the movement of the input rod 205. For example, the travel sensor 210 detects how far the input rod 205 moves from a starting position. The travel sensor 210 is communicatively coupled to the electronic controller 115 and sends the distance traveled by the input rod 205 to the electronic controller 115.

The electronic controller 115 determines control signals for the permanent magnet synchronous machine 215 (for example, determining a torque of the permanent magnet synchronous machine 215 based upon the distance traveled by the input rod 205 received from the travel sensor 210). The permanent magnet synchronous machine 215 is configured to move the gear system 220. The gear system 220 converts a torque of the permanent magnet synchronous machine 215 into boost power for the boost element 225. The boost element 225 then applies force based upon the boost power to the master cylinder 230, where the applied force is converted into hydraulic pressure to actuate the brakes 120-123.

In a closed loop control system for the electromechanical braking mechanism 110, the electromechanical braking mechanism 110 may include sensors that detect a position of a rotor of the permanent magnet synchronous machine 215 (a rotor position sensor) and a sensor that detects a current of the permanent magnet synchronous machine (a motor current sensor). These sensors are used as feedback mechanisms for the electronic controller 115 as described below.

In some embodiments, the master cylinder 230 also includes a master cylinder pressure sensor. The master cylinder pressure sensor detects a hydraulic pressure in the master cylinder. The master cylinder pressure sensor may be communicatively coupled to the electronic controller 115 and may also be configured to send the hydraulic pressure of the master cylinder 230 to the electronic controller 115.

Figure 3:
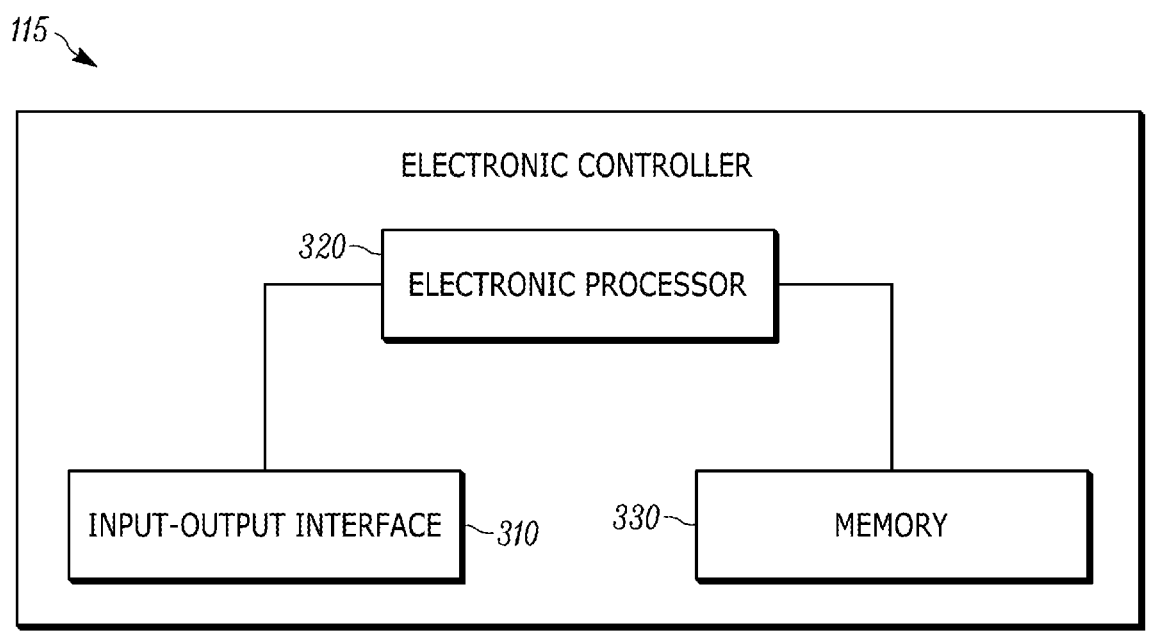
FIG. 3 illustrates an electronic controller according to one embodiment.

The electronic controller 115 is illustrated in FIG. 3 according to one embodiment. The electronic controller 115 includes an input-output interface 310, an electronic processor 320 (such as a programmable electronic microprocessor, microcontroller, and similar device), and a memory 330 (for example, non-transitory, machine-readable memory). The electronic processor 320 is communicatively coupled to the memory 330 and the input-output interface 310. The electronic processor 320, in coordination with the memory 330 and the input-output interface 310, is configured to implement, among other things, the methods described herein.

It is to be understood that the electronic controller 115 may include a plurality of electrical and electronic components that provide power, operation control, and protection to the components and modules within the electronic controller 115 that are not described herein.

The electronic controller 115 may be implemented in several independent controllers (for example, programmable electronic control units) each configured to perform specific functions or sub-functions. Additionally, the electronic controller 115 may contain sub-modules that include additional electronic processors, memory, or application-specific integrated circuits (ASICs) for handling input/output functions, processing of signals, and application of the methods listed below. In other embodiments the electronic controller 115 includes additional, fewer, or different components.

Figure 4:
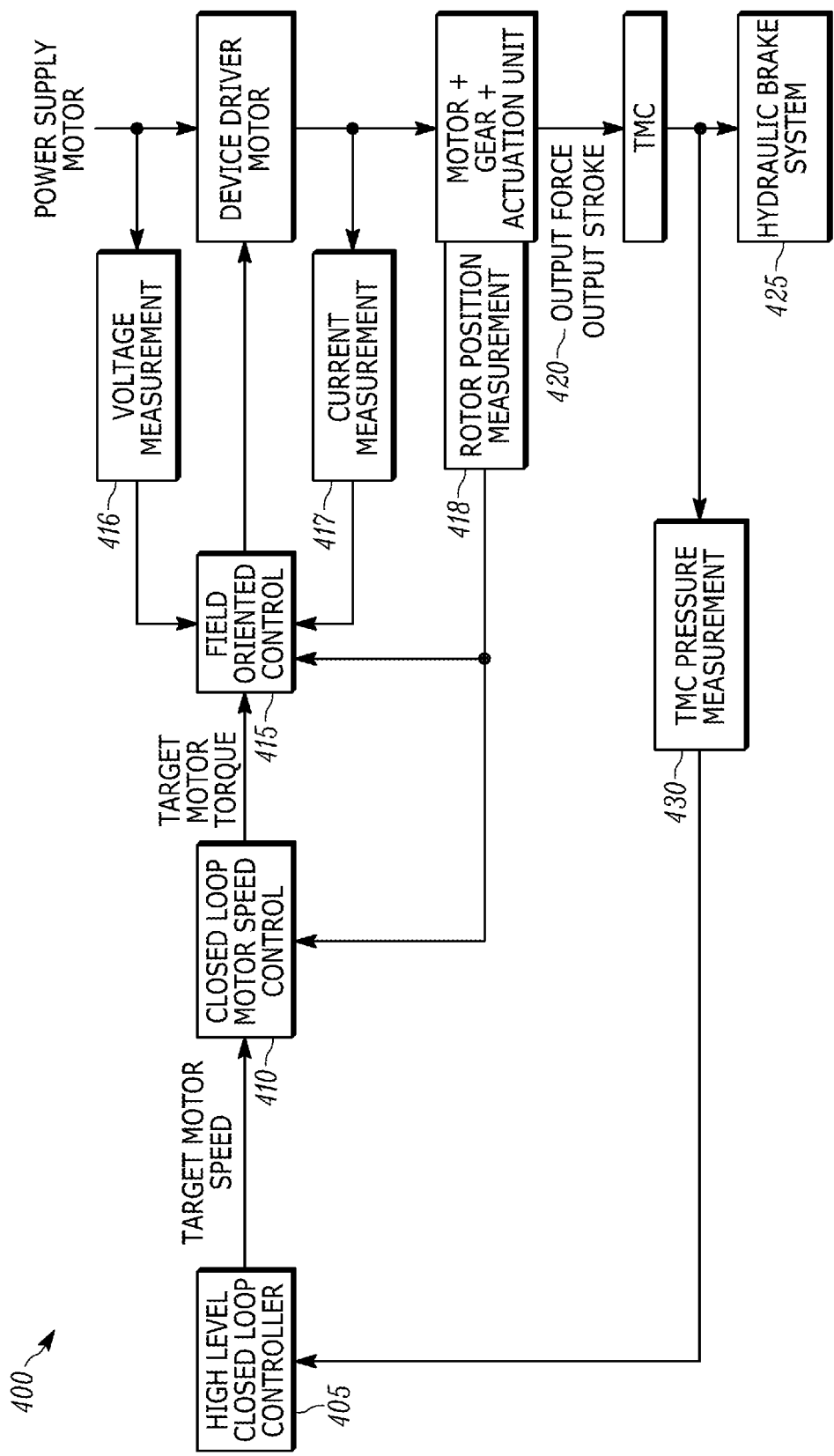
FIG. 4 illustrates a closed-loop method of controlling an electromechanical braking mechanism according to one embodiment.

FIG. 4 illustrates a closed loop control system 400 for the electromechanical braking mechanism 110. The closed loop control system 400 is implemented using the electronic controller 115. For example, a high level closed loop controller 405 may be implemented as a sub-controller or a microprocessor within the electronic controller 115 or as a set of software instructions stored in the memory 330. The high level closed loop controller 405 receives a signal from the travel sensor 210 indicating how far the input rod 205 has traveled. Based upon the distance traveled, the high level closed loop controller 405 determines a target motor speed ("Target Motor Speed") for the permanent magnet synchronous machine 215.

The high level closed loop controller 405 sends the target motor speed to a closed loop motor speed controller 410. Like the high level closed loop controller 405, the closed loop motor speed controller 410 may be implemented as a sub-controller or microprocessor in the electronic controller 115, or as software instructions stored in the memory 330. The closed loop motor speed controller 410 receives the target motor speed and determines, based upon the target motor speed, a target motor torque.

The closed loop motor speed controller 410 sends the target motor torque ("Target Motor Torque") to a field-oriented controller 415 (implemented in a similar manner to the high level closed loop controller 405). The field-oriented controller 415 relies on a voltage measurement 416 from a power supply, a motor current measurement 417 from the motor current sensor, and a rotor position measurement 418 from the rotor position sensor. The field-oriented controller 415 outputs a duty cycle indicating a target voltage for each of three phases of the permanent magnet synchronous machine 215 based upon the target motor torque, the voltage measurement 416, the motor current measurement 417, and the rotor position measurement 418. The duty cycles of each of the three phases generate a stator voltage space vector, which determines the motor torque and the rotation of the rotor.

The stator voltage space vector is sent to the permanent magnet synchronous machine 215, which applies the motor torque to the gear system 220, which in turn creates an output force and output stroke 420 at the boost element 225. This output force and output stroke 420 is applied to the master cylinder 230, increasing hydraulic pressure in the master cylinder 230 and applying the hydraulic pressure to the brakes 120-123 (at block 425).

In some embodiments, the created hydraulic pressure is measured by a master cylinder pressure sensor as a master cylinder hydraulic pressure measurement (430), which is then used as feedback by the high level closed loop controller 405. For example, the high level closed loop controller 405 may determine an expected hydraulic pressure based upon the target motor speed. The high level closed loop controller 405 then compares the received master cylinder hydraulic pressure measurement 430 to the expected hydraulic pressure to determine if the components of the electromechanical braking mechanism 110 are operating correctly.

The closed loop motor speed controller 410 also receives the rotor position measurement 418. This allows for a more accurate target motor torque calculation.

The field-oriented controller 415 relies on accurate measurements, such as the rotor position measurement 418, from the various sensors it receives signals from in order to apply the correct amount of braking force received from a brake request (through the input rod 205 or another brake request). For example, if the motor current sensor is not working properly or if the rotor position sensor is not working properly, the field-oriented controller 415 will not be able to provide the correct duty cycles to the permanent magnet synchronous machine 215. This will cause an incorrect amount of braking force to be applied to the brakes 120-123.

Figure 5:
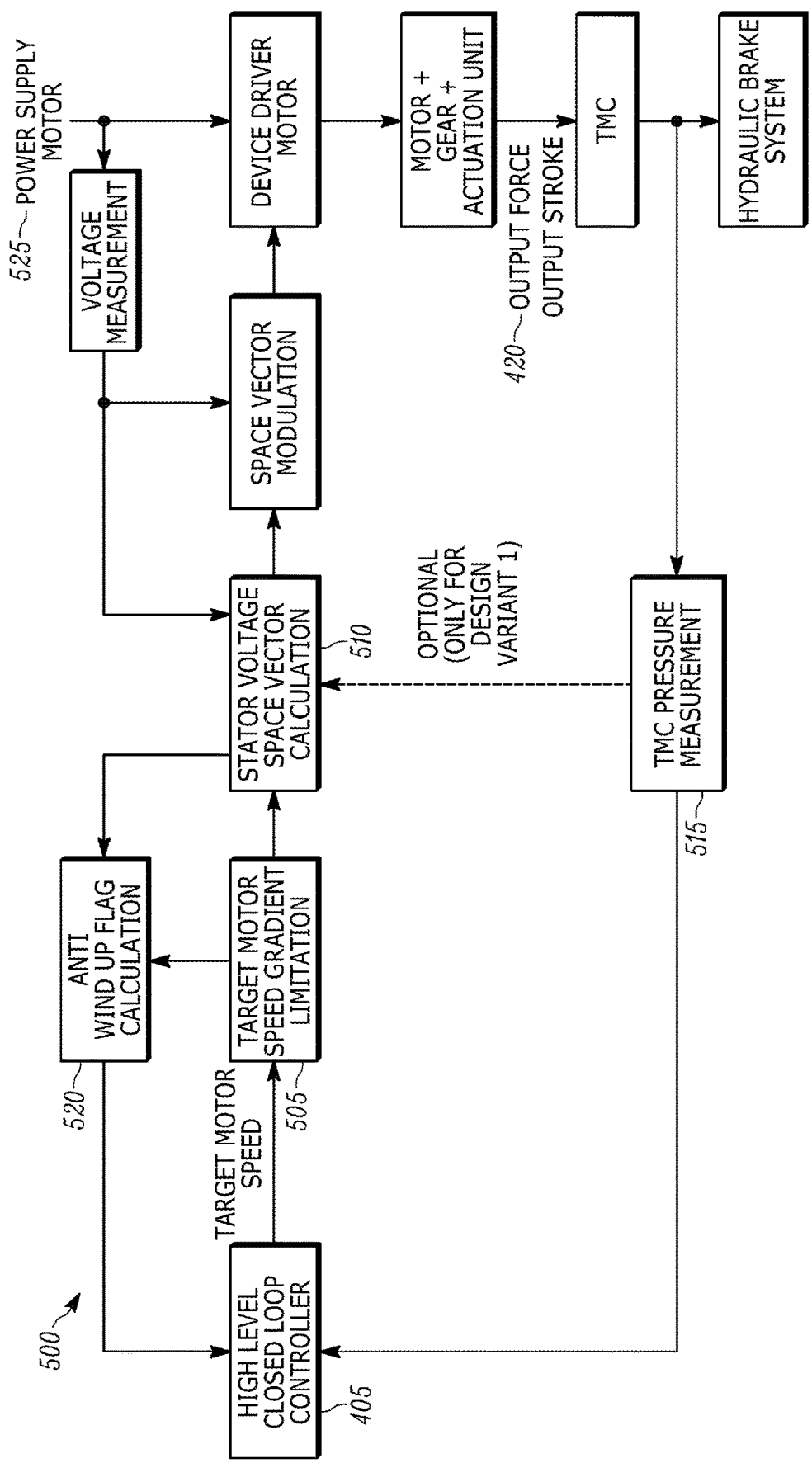
FIG. 5 illustrates an open-loop method of controlling an electromechanical braking mechanism according to one embodiment.

In order to provide redundancy and a failsafe system in case one or more sensors fail, an open-loop control system 500 is required. Such an open-loop control system 500 is illustrated in FIG. 5.

The electronic controller 115 is configured to determine if one or more sensors (in particular, the motor current sensor and the rotor position sensor) are not working correctly. For example, the electronic controller 115 is configured to determine when one or more sensors are not sending a signal to the electronic controller 115. In another example, the electronic controller 115 may be receiving feedback from the one or more sensors, but the one or more sensors are sending data back to the electronic controller 115 that, when compared to an expected value (such as a pressure value in the master cylinder 230), is determined to be an incorrect value.

The open-loop control system 500 still utilizes the high level closed loop controller 405 to determine a target motor speed for the permanent magnet synchronous machine 215 as described above. However, because one or more sensors (such as the motor current sensor or the rotor position sensor) are not working correctly, the closed loop motor speed controller 410 and the field-oriented controller 415 may not be able to correctly operate.

In the case that the closed loop motor speed controller 410 and/or the field-oriented controller 415 are not operating correctly, the electronic controller 115 determines a target motor speed ("Target Motor Speed") (using the high level closed loop controller 405) and determine a target motor speed gradient limitation (block 505). Because the electronic controller 115 is not receiving feedback from the motor current sensor or the rotor position sensor, the electronic controller 115 determines a maximum speed limit and a maximum amount of allowable change in speed for the permanent magnet synchronous machine 215. As described below, if the target motor speed is too high (for example, beyond an operating range of a stator magnetic field of the permanent magnet synchronous machine 215), the rotor of the permanent magnet synchronous machine 215 may rotate asynchronously with the stator magnetic field of the permanent magnet synchronous machine 215, causing incorrect braking behavior.

In order to operate the permanent magnet synchronous machine 215 when the motor current sensor and/or the rotor position sensor are not working, the electronic controller 115 generates a control signal to control the permanent magnet synchronous machine 215 to create a stator magnetic field. The stator magnetic field is created with a specified angular velocity (specified by the electronic controller 115).

The stator magnetic field, when generated by the permanent magnet synchronous machine 215, causes the rotor of the permanent magnet synchronous machine 215 to rotate. The stator magnetic field rotates with the specified angular velocity and the rotor of the permanent magnet synchronous machine 215 rotates synchronously with the stator magnetic field. The electronic controller 115, when the permanent magnet synchronous machine 215 generates the stator magnetic field, operates the rotor of the permanent magnet synchronous machine 215 as a stepper motor. For each stepwise change in a rotating field axis of the stator magnetic field, the rotor of the permanent magnet synchronous machine 215 changes position to a position of the rotating field axis.

Due to inertia and friction forces, the rotor of the permanent magnet synchronous machine 215 may be delayed in following the position of the rotating field axis. In order to prevent or minimize this delay, a change rate of the angular velocity of the stator magnetic field (a frequency of the stator magnetic field) needs to be limited by target motor speed gradient limitation 505.

The permanent magnet synchronous machine 215 faces a load torque when applying hydraulic pressure (using the gear system 220 and the boost element 225) to the master cylinder 230. As the load torque increases, the rotor of the permanent magnet synchronous machine 215 may begin to lag behind the rotating field axis, following the rotating field axis at an angle. For example, while the rotor of the permanent magnet synchronous machine 215 is still rotating synchronously with the rotating field axis, the position of the rotor follows the position of the rotating field axis at an angle (such as 10 degrees behind the position of the rotating field axis) at the same angular velocity as the stator magnetic field. As long as an internal torque of the permanent magnet synchronous machine 215 is greater than the load torque, the rotor follows the rotating field axis synchronously, but at an angle.

In order to ensure that the internal torque of the permanent magnet synchronous machine 215 is always higher than a load torque (and therefore to ensure that the rotor of the permanent magnet synchronous machine 215 is not asynchronous with the rotating field axis of the stator magnetic field), the frequency of the stator magnetic field and a stator magnetic flux strength of the stator magnetic field are selected so that there is enough internal torque to handle the brake request. The electronic controller 115 therefore determines the frequency of the stator magnetic field and a stator voltage space vector (at block 510) based upon the determined stator magnetic flux strength, which is used to operate the permanent magnet synchronous machine 215, and therefore control the internal torque of the permanent magnet synchronous machine 215.

Two different design variants allow for the electronic controller 115 to control the internal torque of the permanent magnet synchronous machine 215. The first design variant allows for the electronic controller 115 to receive, from a master cylinder pressure sensor, a hydraulic pressure of the master cylinder 230 (at block 515). The hydraulic pressure is a measure of a pressure in the master cylinder 230, which indicates how much load the permanent magnet synchronous machine 215 experiences when applying pressure (through the gear system 220 and boost element 225) to the master cylinder 230. Based upon the hydraulic pressure, the electronic controller 115 determines the frequency of the stator magnetic field and the stator magnetic flux strength of the stator magnetic field that is then generated by the permanent magnet synchronous machine 215.

The stator magnetic flux strength is determined based upon a stator space vector current, which is in turn based upon a stator voltage space vector length.

The second design variant includes the electronic controller 115 creating a stator voltage space vector with a fixed length, which in turn causes the stator magnetic flux strength to be fixed. For example, the stator voltage space vector length may be fixed so that the internal torque of the permanent magnet synchronous machine 215 is always greater than a pressure (load torque) of the master cylinder 230 would require.

In some embodiments, if the target motor speed gradient limit is reached, the electronic controller 115 sets a flag (block 520) to not request more motor speed. For example, once the target motor speed gradient is determined, the electronic controller 115 may request an amount of motor speed that is less than the limit (for example, for a brake request that does not require a large motor speed). If a new brake request is received by the electronic controller 115 (for example, the input rod 205 is further depressed by an operator of the vehicle 100), the electronic controller 115 may then request a faster motor speed. However, if the target motor speed gradient is reached, the electronic controller 115 sets the flag at block 520. If a new brake request is received after the flag is set, the electronic controller 115 will not request a higher motor speed. A request for a speed higher than the target motor speed gradient limit may cause the rotor of the permanent magnet synchronous machine 215 to become asynchronous with the rotating field axis of the stator magnetic field produced by the permanent magnet synchronous machine 215.

In some embodiments, the electronic controller 115 determines the target motor speed gradient limitation based in part upon a power supply voltage from a power supply motor (at block 525). For example, if less power is available for the permanent magnet synchronous machine 215, the target motor speed gradient limitation may be lower in order to compensate for less power being available to apply a torque to the permanent magnet synchronous machine 215.

Thus, embodiments described herein generally provide systems and methods of implementing open loop motor control for an electromechanical brake when closed loop motor control fails.

Various features, advantages, and embodiments are set forth in the following claims.

What is claimed is:

1. A system for providing open loop motor control for an electromechanical brake when closed loop motor control fails, the system comprising:
    an electromechanical brake mechanism including a permanent magnet synchronous machine,
    a rotor position sensor configured to detect a position of a rotor of the permanent magnet synchronous machine,
    a motor current sensor, and
    an electronic controller configured to
        determine whether at least one of the rotor position sensor and the motor current sensor is not operating correctly,
        generate a control signal for controlling the permanent magnet synchronous machine, wherein the control signal includes a stator magnetic flux strength, a frequency of the stator magnetic field, and a specified angular velocity of the stator magnetic field, and
        activate the permanent magnet synchronous machine using the generated control signal to generate a stator magnetic field to operate the rotor of the permanent magnet synchronous machine.

2. The system of claim 1, further comprising a master cylinder pressure sensor.

3. The system of claim 2, wherein the electronic controller receives a master cylinder pressure from the master cylinder pressure sensor and sets the stator magnetic flux strength of the permanent magnet synchronous machine based upon the master cylinder pressure sensor.

4. The system of claim 1, wherein the stator magnetic flux strength is set, with the electronic controller, by applying a stator voltage space vector.

5. The system of claim 1, wherein the rotor of the permanent magnet synchronous machine rotates synchronously with the stator magnetic field of the permanent magnet synchronous machine.

6. The system of claim 1, wherein an internal torque of the permanent magnet synchronous machine is controlled, with the electronic controller, to be higher than a load torque of the permanent magnet synchronous machine.

7. The system of claim 1, wherein the electronic controller limits a maximum allowable motor speed gradient in order to prevent the rotor of the permanent magnet synchronous machine from becoming asynchronous with the stator magnetic field.

8. The system of claim 7, wherein the maximum allowable motor speed gradient is based upon a maximum allowable frequency of the stator magnetic field.

9. The system of claim 7, wherein a maximum allowable motor speed gradient is based upon a power supply voltage.

10. A method of providing open loop motor control for an electromechanical brake when closed loop motor control fails, the method comprising:
    determining, with an electronic controller, whether a rotor position sensor or a current sensor is not operating correctly,
    generating, with the electronic controller, a generated control signal for controlling a permanent magnet synchronous machine, wherein the generated control signal includes a stator magnetic flux strength, a frequency of the stator magnetic field, and a specified angular velocity of the stator magnetic field, and
    activating, with the electronic controller, the permanent magnet synchronous machine using the generated control signal to generate a stator magnetic field to operate the rotor of the permanent magnet synchronous machine.

11. The method of claim 10, further comprising receiving, with the electronic controller, a master cylinder pressure from a master cylinder pressure sensor.

12. The method of claim 11, setting, with the electronic controller, the stator magnetic flux strength of the permanent magnet synchronous machine based upon the master cylinder pressure sensor.

13. The method of claim 10, further comprising setting, with the electronic controller, the stator magnetic flux strength of the permanent magnet synchronous machine by applying a stator voltage space vector.

14. The method of claim 10, wherein the rotor of the permanent magnet synchronous machine rotates synchronously with the stator magnetic field of the permanent magnet synchronous machine.

15. The method of claim 10, further including controlling, with the electronic controller, an internal torque of the permanent magnet synchronous machine to be higher than a load torque of the permanent magnet synchronous machine.

16. The method of claim 10, further including limiting, with the electronic controller, a maximum allowable motor speed gradient in order to prevent the rotor of the permanent magnet synchronous machine from becoming asynchronous with the stator magnetic field.

17. The method of claim 16, wherein the maximum allowable motor speed gradient is based upon a maximum allowable frequency of the stator magnetic field.

18. The method of claim 16, wherein a maximum allowable motor speed gradient is based upon a power supply voltage.

* * * * *